No. 879,321. PATENTED FEB. 18, 1908.
C. H. RIDER.
PROCESS OF MANUFACTURING GAS.
APPLICATION FILED JULY 12, 1907.
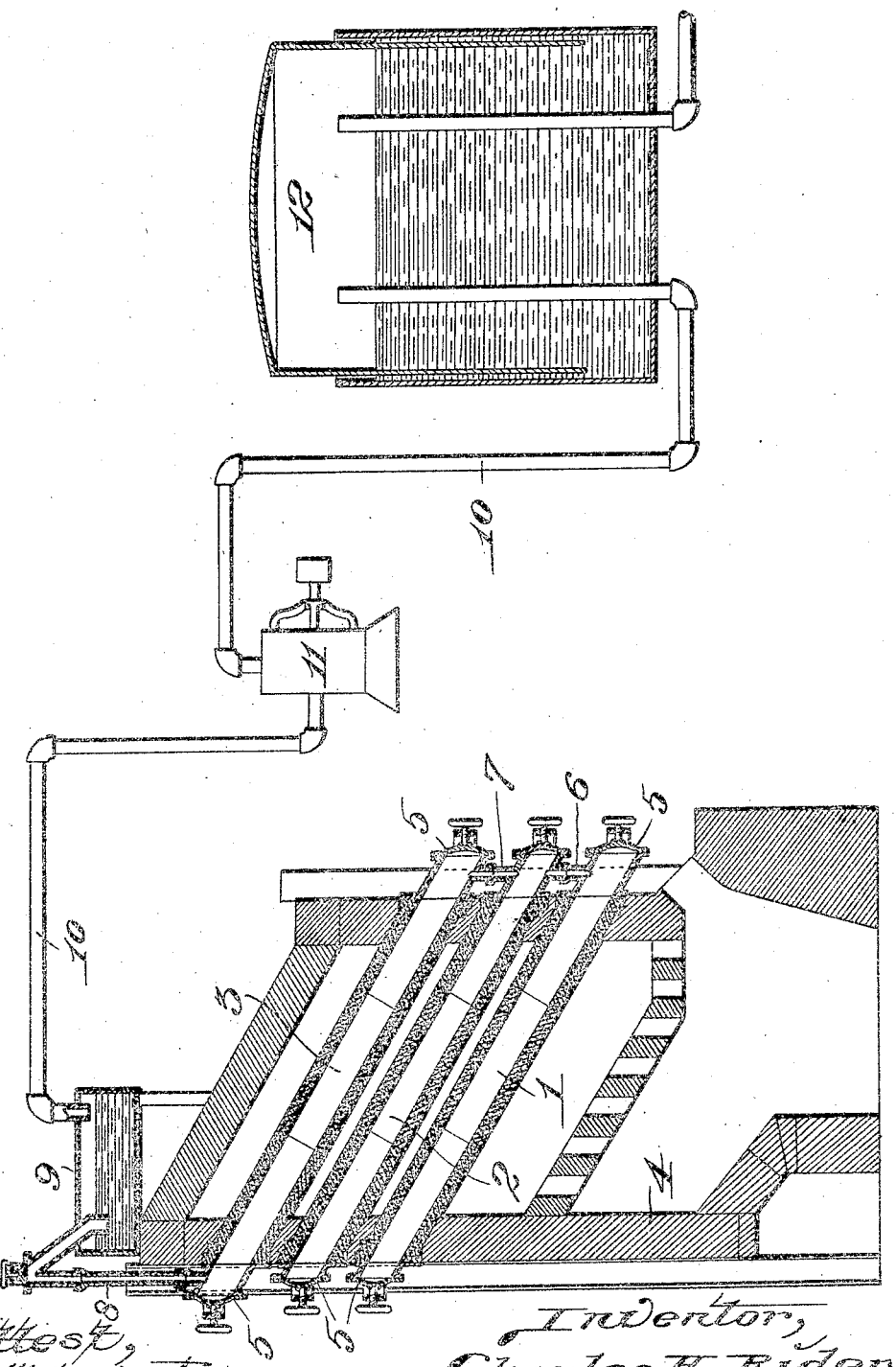

UNITED STATES PATENT OFFICE.

CHARLES H. RIDER, OF ST. LOUIS, MISSOURI.

PROCESS OF MANUFACTURING GAS.

No. 879,321.

Specification of Letters Patent.

Patented Feb. 18, 1908.

Application filed July 12, 1907. Serial No. 383,430.

*To all whom it may concern:*

Be it known that I, CHARLES H. RIDER, a citizen of the United States, and resident of St. Louis, Missouri, have invented certain new and useful Improvements in Processes of Extracting and Manufacturing Fuel-Gas from a Mixture of Mineral Carbonates and Organic Substances, of which the following is a specification containing a full, clear, and exact description, reference being had to the accompanying drawings, forming a part hereof.

My invention relates to a process of extracting and manufacturing fuel gas from a mixture of mineral carbonates and organic substances, my object being to exclude as completely as possible all non-ignitible elements, such as nitrogen and oxygen, from the air, and to completely decompose the organic substance used in connection with the mineral carbonate or carbonates in such a manner as to form staple ignitible gases from the carbon, oxygen and hydrogen contained in both the mineral carbonate and organic substances used, leaving as a residuum ash, mineral o id. metals and the non-volatile inorganic substances that may be contained in the mineral carbonate used.

The drawing is a diagrammatic view of an apparatus adapted for carrying out my improved process, and, as shown, the apparatus comprises a series of retorts, 1, 2 and 3, constructed of fire clay, or analogous material, arranged in the usual manner in a furnace 4; and the ends of said retorts being normally closed by removable plates 5.

The forward ends of the retorts 1 and 2 are united by a tubular connection 6, and in like manner the forward ends of the retorts 2 and 3 are united by a tubular connection 7, and leading upwardly from the upper rear end of the retort 3 is a discharge pipe 8, which leads to a water seal or trap 9. Leading from the trap 9 is a pipe 10, in which is located an exhauster 11, and said pipe leads to a gasometer or storage tank 12.

In general operation, the mineral carbonate is broken to the desired size and then mixed with the organic substance which has been cut or ground to the desired size to form a close mixture with the mineral carbonate in such proportions that the carbon in the organic substance used is equal to about ten per cent. (10%) by weight of the mineral carbonates used.

The mineral carbonate used may be magnesium carbonate, calcium carbonate, calcium and magnesium carbonate, cupric carbonate, or cuprous carbonate, or any mineral carbonate which does not contain an objectionable volatile metal may be used.

The organic substance used may be dried vegetable matter, leaves, straw, corn stalks, saw dust, barks, or any dry organic substance containing hydrogen and carbon, or hydrogen, carbon and oxygen.

The mixed substance is placed in retorts 1, 2 and 3 until said retorts are about three-fourths full. The doors to all the retorts are now closed air tight, and fire is built in the furnace, using as fuel coal, wood, oil, alcohol, or gas, as may be desired, and the temperature in the retorts is brought up to about 1200 degrees F., which temperature is maintained as near as possible until all the volatile matter has been expelled from the carbonate and the organic substance has been decomposed into gas, which is usually accomplished in three or four hours.

During the decarbonization of the mineral carbonates in connection with an organic substance, the exhauster 11 is operated continuously so as to remove the gases from the retorts 1, 2 and 3 as fast as generated, thereby hastening the operation, and at the same time preventing an excess pressure against the walls of said retorts.

The gases generated in the retorts 1 and 2 are drawn through the tubular connections 6 and 7, to and through the retort 3, and from thence said gases pass through the discharge pipe 8 into the trap or water seal 9, and thence through pipe 10 to the gas holder 12, from whence said gas may be drawn off and used as desired.

The object for passing the gases generated in retorts 1 and 2 through retort 3, as described, is to utilize the hot gases from retorts 1 and 2 to assist in keeping the heat in retort 3 equal to the heat in retorts 1 and 2, retort 3 being located at a greater distance from the fire box. By this method a more uniform heat is attained in all three retorts, and at the same time the gases are thoroughly mixed before entering the gas holder. During this operation, the water formed during the decomposition of the organic substance in the presence of the hot mineral carbonate is converted into methane and hydrogen gases, and at the same time the carbon dioxid formed during the decomposition of the mineral carbonate in the presence of an organic substance reacts upon the carbon contained in the organic substance, forming carbon monoxid, the result being the production of a gas high in calorific power, the analysis showing only traces of oxygen and a small percentage of nitrogen.

I claim:

1. The herein described process of producing a fuel gas, which consists in decomposing a mixture consisting of a mineral carbonate and an organic substance in an air tight retort by heat.

2. The herein described process of generating fuel gas from mineral carbonates, which consists first in placing a mixture consisting of a mineral carbonate and an organic substance in an air tight retort and then applying a sufficient amount of heat to said retort to decompose said organic substance.

3. The herein described process of generating fuel gas from mineral carbonates which consists first in placing a mixture consisting of a mineral carbonate and an organic substance in an air tight retort and then applying a sufficient amount of heat to said retort to decompose said mineral carbonates.

4. The herein described process of producing a fuel gas from mineral carbonates and an organic substance, which consists in first taking a mixture consisting of a mineral carbonate and an organic substance, placing said mixture in a series of air tight retorts, applying heat to said retorts, and causing the gases containing the greatest amount of heat to come in contact with the gases containing a lesser amount of heat, thereby causing a complete mixture of the gases and a uniformity of heat in the said series of retorts.

5. The herein described process of generating fuel gas from mineral carbonates, which consists first in placing a mixture consisting of mineral carbonates and an organic substance in an air tight retort, and then applying a sufficient amount of heat to said retort to decompose said organic substance.

6. The herein described process of generating fuel gas from mineral carbonates, which consists first in placing a mixture consisting of mineral carbonates and an organic substance in an air tight retort, and then applying a sufficient amount of heat to said retort to decompose said mineral carbonates.

In testimony whereof, I have signed my name to this specification, in presence of two subscribing witnesses.

CHARLES H. RIDER.

Witnesses:
M. P. SMITH,
E. L. WALLACE.